(12) United States Patent
Satyanarayana (10) Patent No.: US 7,870,563 B2
(45) Date of Patent: Jan. 11, 2011

(54) TRIGGERING WORKFLOWS BASED ON MIDDLEWARE EVENTS

(75) Inventor: Sudhir Krishna Satyanarayana, Bangalore (IN)

(73) Assignee: SAP AG, Walldorf (DE)

( * ) Notice: Subject to any disclaimer, the term of this patent is extended or adjusted under 35 U.S.C. 154(b) by 1077 days.

(21) Appl. No.: 11/523,498

(22) Filed: Sep. 20, 2006

(65) Prior Publication Data
US 2007/0168397 A1 Jul. 19, 2007

(30) Foreign Application Priority Data
Dec. 30, 2005 (IN) .............................. 26/DEL/2006

(51) Int. Cl.
G06F 3/00 (2006.01)
G06F 15/16 (2006.01)
(52) U.S. Cl. ....................................... 719/314; 709/206
(58) Field of Classification Search .................. 719/314; 709/206
See application file for complete search history.

(56) References Cited

U.S. PATENT DOCUMENTS

| 5,627,764 | A  | * | 5/1997  | Schutzman et al. | 709/207 |
| 5,905,908 | A  | * | 5/1999  | Wagner           | 710/11  |
| 6,138,168 | A  | * | 10/2000 | Kelly et al.     | 719/310 |
| 6,282,565 | B1 | * | 8/2001  | Shaw et al.      | 709/206 |
| 7,161,487 | B1 | * | 1/2007  | Tracey et al.    | 340/572.1 |
| 7,535,479 | B2 | * | 5/2009  | Okita et al.     | 345/629 |
| 7,539,728 | B2 | * | 5/2009  | Perepa et al.    | 709/206 |

OTHER PUBLICATIONS

Rebecca Callison, A Time-Sensitive Object Model for Real-Time Systems, 1995.*

* cited by examiner

*Primary Examiner*—Lechi Truong
(74) *Attorney, Agent, or Firm*—Kenyon & Kenyon LLP (57) ABSTRACT

Workflows are triggered for time-sensitive, user-specific data queued for delivery to a plurality of users. Responsive to time-sensitive data being queued, time-based triggers are created based at least in part upon content of the time-sensitive data. If the time-sensitive data is still in the queue when the time-based trigger expires, one-or-more rules are executed to change a destination of the time-sensitive data.

18 Claims, 7 Drawing Sheets

TRIGGERING WORKFLOWS BASED ON MIDDLEWARE EVENTS

CROSS REFERENCE TO RELATED APPLICATIONS

This application claims foreign priority to Indian patent application No. 26/DEL/2006, dated Jan. 2, 2006, deemed to have been filed on Dec. 30, 2005, the entire contents of which are incorporated herein by reference.

BACKGROUND

"Middleware" is a software platform aimed at enabling synchronization of data from backend systems on to remote devices (e.g., dial-up computer terminals; personal digital assistants (PDAs)). Middleware provides data consolidation from the backend, identifying what data needs to go to which users. Data is queued by the middleware. When a user comes online from a remote device, the middleware synchronizes with the remote device, downloading the queued data to the remote device.

In general, a "front-end" is a type of program or process that is responsible for collecting input from a user (e.g., a user interface), whereas a "backend" is a type of program or process that is responsible for processing the input from the front-end. A backend is not directly accessed by a user, and may carry out tasks independent of the front-end. For example, a user could request data from a database, not knowing that the data is refreshed on the backend on a daily basis. Among other responsibilities, a backend establishes virtual connections (sockets) between processes.

After synchronization between the middleware and a remote device, a user may go offline and perform various tasks. The next time the user comes online, the data is again synchronized between the remote device and the backend system through the middleware.

Middleware uses a queue or queues in order to enable fast synchronization. Until the user comes online the data remains queued. A synchronization module on the middleware and/or the remote device extracts the data from the queue and synchronizes with the remote device. Such data might include sales orders, invoices, purchase approvals, etc. If the user does not come online for days or weeks, the result may be a loss of business opportunities as the data remains waiting in the queue.

DETAILED DESCRIPTION

The problem of time-critical business opportunities languishing in the middleware queue can be remedied by enabling "events" in the middleware through a set of rules and call back functions. Events are time-based triggers that trigger workflows.

The middleware queues user-specific data for a plurality of users. At least some of the data may be time sensitive. As a solution to the problem of time-critical opportunities languishing in the queue, responsive to the time sensitive data being queued, a time-based trigger ("event") is created based at least in part upon content of the time-sensitive data. If the time-sensitive data is still in the queue when the first time-based trigger expires, a destination of the time-sensitive data is changed.

The content of the data upon which the events are based may include (among other things) priority flags, attributes of the data, and rules embedded in the data. Embedded rules may include instructions to implement actions after a certain period of time.

In conjunction with the creation of events based on the content of the data, or as an alternative data management mechanism, a rules engine may provide a mechanism to define rules based on attributes of the data and to define the necessary action that needs to be initiated when the rule is fulfilled. Rules engines are software-based control systems that operate based upon defined models and rules.

The middleware executes the rules and triggers function modules as needed to execute workflows specified by the rules. A workflow is a process that manages the routing of tasks to individuals or groups of users. Workflows automate business processes by integrating tasks across departments, applications, and system boundaries. A workflow maps individual tasks needed to complete the workflow to users/groups, automatically informing users/groups of user of their role in the workflow and providing them with whatever information is required for the task. Steps which do not require user intervention may be carried out automatically.

To manage time-sensitive data, the middleware may interact with a workflow engine. A "workflow engine" is a software-based control system that manages workflows. A workflow engine may operate in conjunction with a rules engine to define the behavior of particular workflows. The backend of software platforms such as groupware (e.g., Lotus® Notes®, Microsoft® Outlook®) and collaboration systems with integrated management capabilities such as financial management, customer relationship management, and sales management (e.g. SAP® Business One) may coordinate data distribution with a workflow engine, which may operate as either an independent process or as a component of a software application.

In addition to designating to whom data needs to go, a workflow engine may monitor the progress of a workflow task, automatically send reminders, automatically move a workflow task from one user to another if action on the task is not timely, and automatically designate a next recipient or recipients to receive the workflow when a user fulfills their assigned task in the workflow. Workflow engines may integrate data from other sources to determine whether a task needs to be redistributed. For example, a workflow engine may automatically monitor things such as groupware out-ofoffice data to determine that a designated user for a workflow will be unavailable, such that a workflow task needs to be reassigned.

In existing systems, the workflow engine loses control of data while it is sitting in a middleware queue. If the workflow engine determines that data needs to be moved while the data is sitting in the queue for delivery, the conventional recourse is for the workflow engine to send a recall notice to the same user, which itself is then added to the middleware queue for delivery to that user (together with the original data to be recalled). An analogous circumstance can be seen in Microsoft® Outlook®, where a recall notice is not acted upon until the recall notice is delivered to the user. While this data management scheme works, disadvantages include the need for the workflow engine to maintain a copy of the original workflow (if the workflow engine is enabled to recall and resend a workflow while the original task is stuck elsewhere), and the queue capacity and communication bandwidth wasted on delivering both the queued task and the recall notice to the user originally designated to receive the task.

Ordinarily, when data goes into a middleware queue, there is no way to know whether it will be acted upon after queuing. By setting an "event" within the middleware, whether queued data is acted upon can be better managed. The use of events created when data is placed in the queue, and updating or canceling the event when the data is removed from the queue or acted upon is computationally more efficient than polling the queue to determine the status of time-sensitive data.

Figure 1:
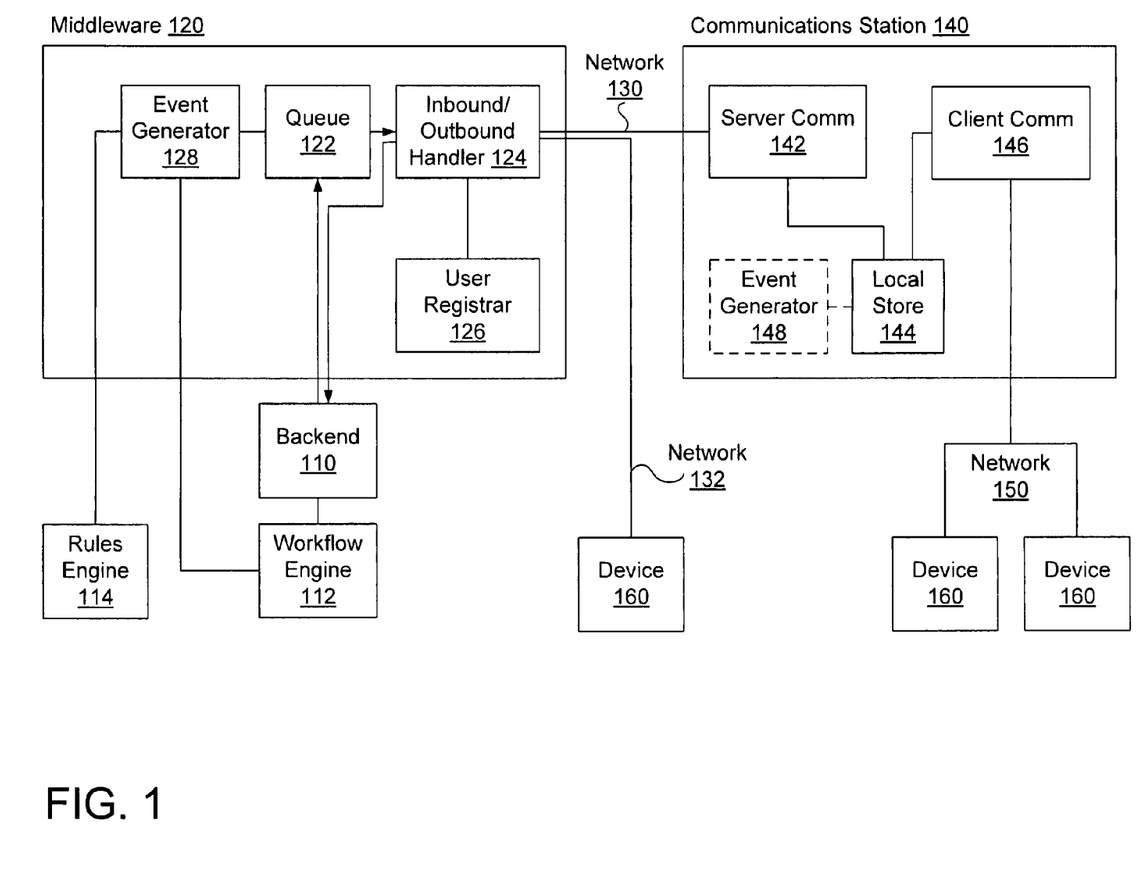
FIG. 1 is a block diagram illustrating components in an example system, including a middleware component that manages time sensitive data using events.

FIG. 1 is a block diagram of an example system including middleware 120 that manages time sensitive data using events. The system includes a backend system 110, which represents the backend of a software application or process. Preferably, the backend 110 is a component of a collaboration system with integrated management capabilities, although any software process might be used. The backend 110 may coordinate with a workflow engine 112. The workflow engine 112 may be a component of a same software package as the backend 110, or may be a separate process.

Figure 2:
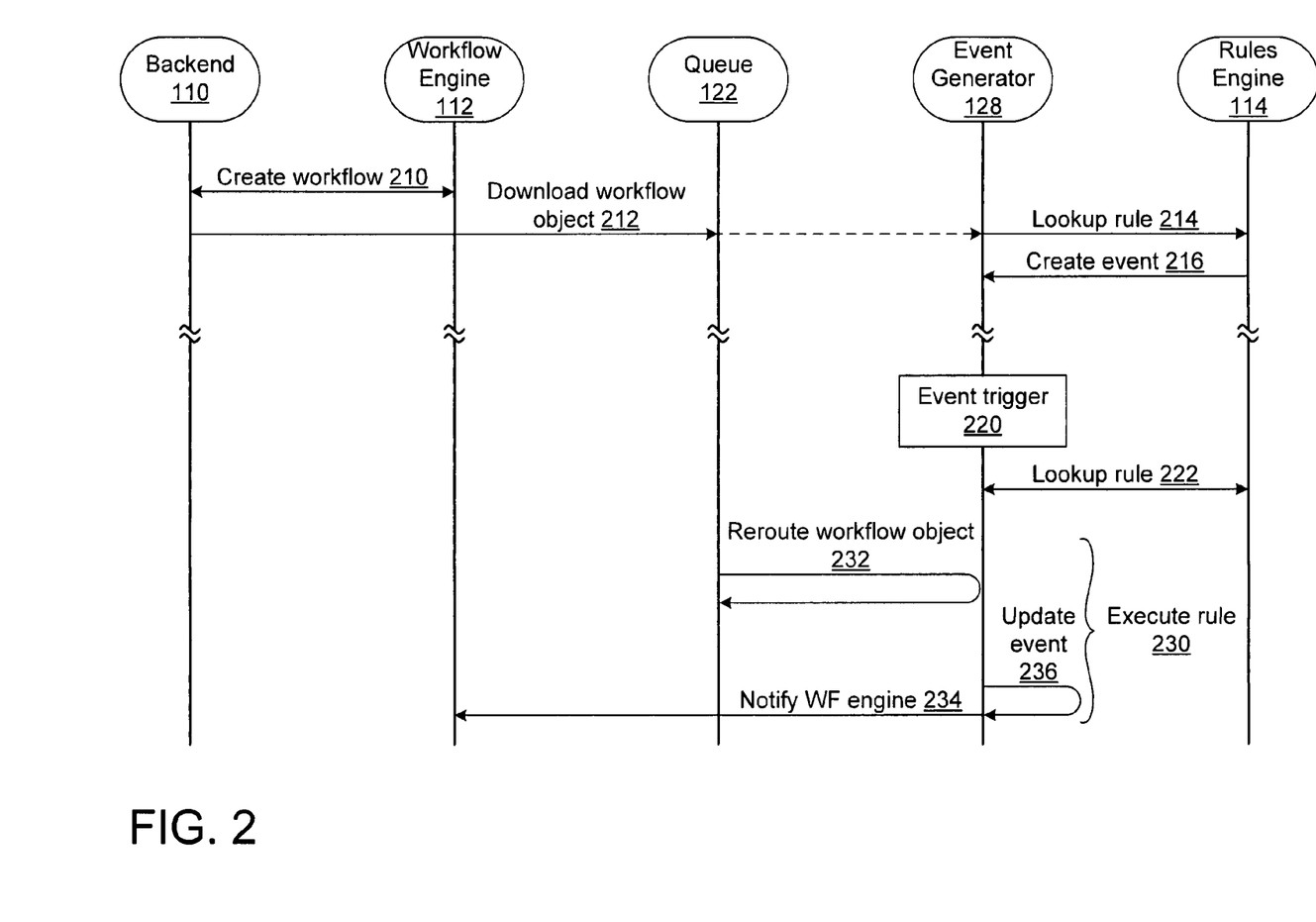
FIG. 2 is a flow diagram illustrating the creation and triggering of an event in middleware with the middleware redesignating the data for delivery to a different user.

Referring to FIG. 2, the backend coordinates (210) with the workflow engine 112 to create a workflow object. The information core of a workflow is a workflow object, such as a "business object". A business object is data representing an entity in the real business world. For example, a business object can represent customers, contact persons, products, sales opportunities, sales activities, sales promotions, business transactions (e.g., a purchase order), a contract, a policy, and an application (e.g., a loan application). Each business object has elements that can be modeled to capture business data.

The inner structure of a business object is ordinarily concealed from a user. A business object may comprise persistent data (e.g., data tied to a database) and embedded business logic. The business logic is composed of machine-executable instructions which govern the behavior and properties of the object, including how the data is organized for presentation and the inter-relationship of data. Properties of the object may represent the attributes of the entity in the real business world, providing business "meaning" behind object data. For example, a Sales Order object can have properties like order number, order date, and quantity. The business logic may also include machine-executable instructions for performing specific operations such as the manipulation and validation of data. For example, the Sales Order object can have a method to calculate and get the line-items total.

When creating the business object, the coordination between the workflow engine 112 and the backend 110 and may include such things as determining to whom the object should be sent first.

Once the object has been created, it may be sent (212) to a queue 122 (i.e., data storage memory) of middleware 120 for delivery to the assigned user or users. The data remains in the queue until a user device connects to accept delivery.

To create and manage events for time-sensitive data, an event generator 128 has been added to the middleware 120. The event generator 128 selectively creates an event when data is added to the queue 122. As mentioned above, the creation of discrete time-based "events" in the middleware is considerably more efficient than periodically polling the queue.

Several methods can be used to create an event.

As a first method to create an event, a time-sensitive flag is added to the object by the backend 110 and/or workflow engine 112 before it is sent to the middleware 120. Responsive to the event generator 128 detecting the flag when the object is added to the queue 122, the event generator 128 determines (214) which rule or rules apply to the object in coordination with a rules engine 114. The rules engine 114 may be part of the middleware 120, may be the same rules engine as used by the workflow engine, or may be a another process. Once the appropriate rule is determined, an event is created (216).

The event generator 128 may extract various data from an object that is tagged as time-sensitive such as the subject matter of the object (e.g., sales order) and a due date. Based on such data, the rules engine 114 searches for a matching rule, from which an event can be created (216). For example, a rule might indicate that if a due date falls upon a weekend, to redirect the object to a different user prior to the weekend. Rules may also factor in other data available to the middleware 120. For example, if statistics are kept on the frequency with which a user connects to the middleware 120, a rule may include a heuristic to set the event trigger based in part upon such frequency statistics (e.g., if the time until the deadline is less than the statistically likely next connection to the user, advance the event to trigger at an earlier time).

As a second method, the rules for the creation of events may be incorporated into the object by the backend 110 and/or workflow engine 112. Such rules might include an instruction to be interpreted by the event generator 128, or to invoke a particular function module of the middleware 120. Such an object may or may not include a time-sensitive flag. The logic for the creation of events may be included in the object by the backend 110 or workflow engine 112 specifically for execution by the event generator 128 in the middleware 120, or may be logic that is included in the object without consideration that the event-aware middleware 120 is in the communications chain with the user. As an example of the latter, the workflow engine 112 may embed detailed logic for the entire workflow (e.g., the sequence of recipients, due dates, reminder dates, alternate recipients) within an object without consideration of the event-aware middleware 120, which the event generator 128 may use to generate an event.

As a third method, the event generator 128 may inspect objects submitted to the queue 122 and determine whether an event should be generated based on whether a rule or rules apply. In other words, even if no time-sensitive tag or event logic is embedded in the object, the event generator can make a determination as to whether the creation of an event is appropriate. As described above, the event generator 128 may extract data from the object, determine (214) if there is a rule for such an object in coordination with a rules engine 114, and generate an event (216) in accordance with the rules.

As a simpler implementation, the event generator 128 may create the event by simply extracting a due date from the object and setting the event trigger to the due date.

These methods may all be applied by a same event generator 128. In practice, the queue 122 may be receiving data from a variety of different backends 110 capable of varying levels of integration with the middleware 120. While the middleware 120 application programming interface (API) may signal to a backend 110 that event generation is available, the particular application may or may not be set up to tag data as time-sensitive, etc. Accordingly, the middleware 120 may determine which event-generation method to apply based upon the source application and/or format of the object. This may be determined, among other ways, by inspecting the object to determine the source application or format, by monitoring the origin of the transaction providing the object to the middleware 120 for queuing, or based on whether an object includes a time-sensitive field (even if the field indicates that the object is not time-sensitive). In addition, the event generator may impose a default rule on all objects not otherwise being assigned an event, such as a rule to make sure that no object remains in the queue for more than a threshold length of time (e.g., return to sender all data remaining in the queue for more than a month).

When an event is triggered (220), the event generator may again apply a rule to determine what action is required. A rule designation may have been included with the event when the rule was created (216) indicating which rule to apply if the event is triggered; rule-based logic may be embedded with the event when the event is created; a new rule lookup may be performed (222) to determine which rule should be applied contemporaneous with event triggering (220); and/or the rule or rules to apply upon triggering (220) may be embedded in the object itself. If an action specified in a rule (embedded or otherwise) is unsuccessful, the event generator may iteratively apply rules from the rules engine 114 until there is a successful execution.

For example, in FIG. 2, execution (230) of a rule may indicate that the event generator 128 should invoke a function module within the middleware 120 to designate that the object should be queued for a different user (232), update the event (236), and notify (234) the workflow engine 112 about the change. The workflow engine 112 is notified of changes for the object so that (among other reasons) accurate workflow status information is available.

Figure 3:
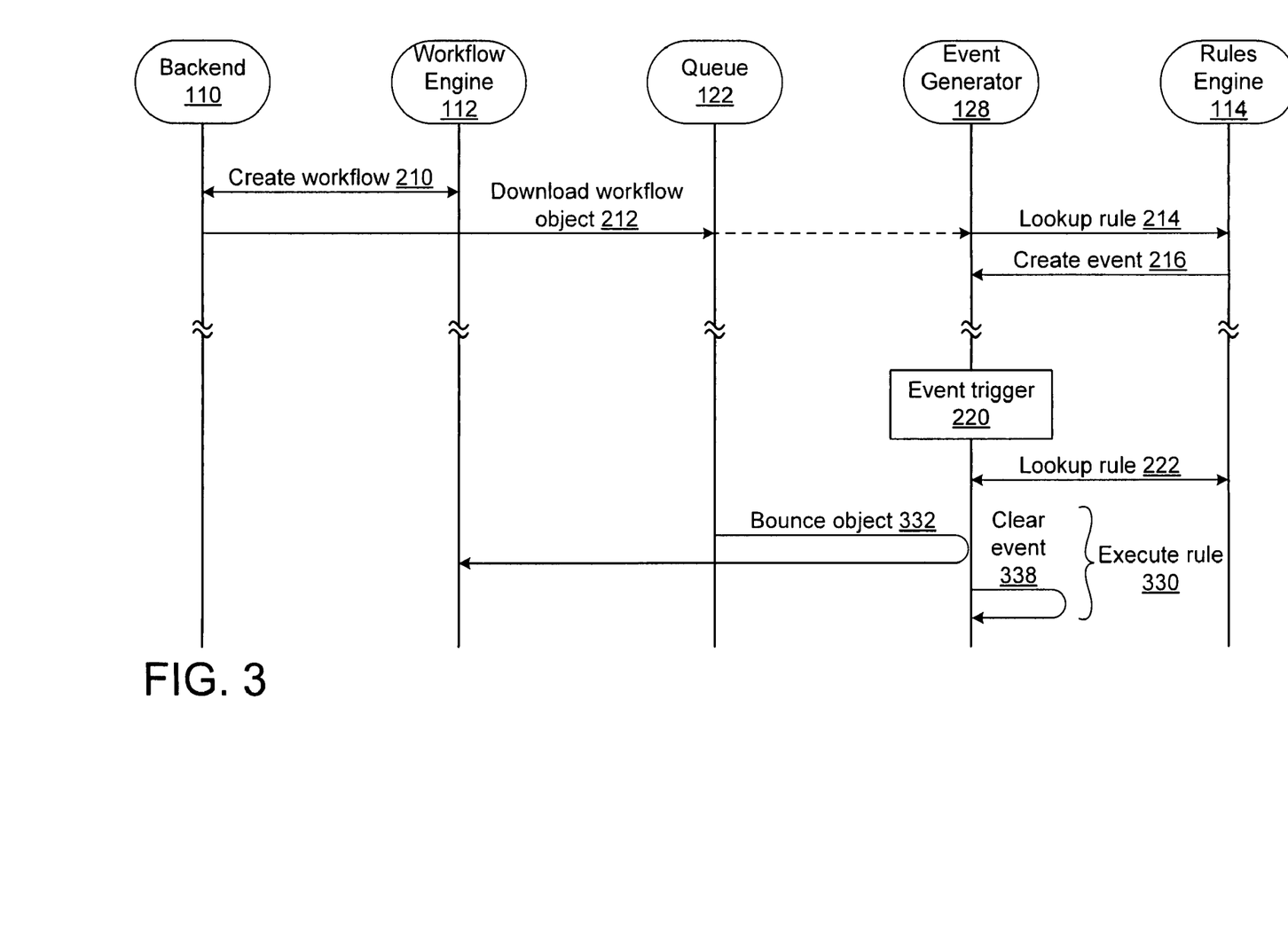
FIG. 3 is a flow diagram illustrating the creation and triggering of an event in middleware with the middleware bouncing the data to a workflow engine for redistribution.

If, however, a rule indicates that the object should be queued for a different user, but a user registrar 126 of the middleware indicates that the user is not affiliated with the middleware 120, then another rule may be executed (e.g., 330 in FIG. 3). In particular, this can occur when logic or data embedded in the object indicates to whom the workflow should be routed, but that user is not registered with the user registrar 126.

For example, a registrar-miss might occur if the middleware 120 is a subscriber-based communications channel and is only one of the communications channels available to the backend 110. The middleware 120 may exist to sync with a certain subset of users (e.g., PDA users), whereas the backend 110 may also have use of other channels such as e-mail.

As illustrated in FIG. 3, a rule upon execution (330) may instruct the event generator 128 to invoke a function module within the middleware 120 to bounce (332) the object out of the queue and clear (338) the event. When an object is bounced from the queue, it is deleted from the queue and sent back to the workflow engine 112, backend 110, or where ever else the rule may designate.

Figure 4:
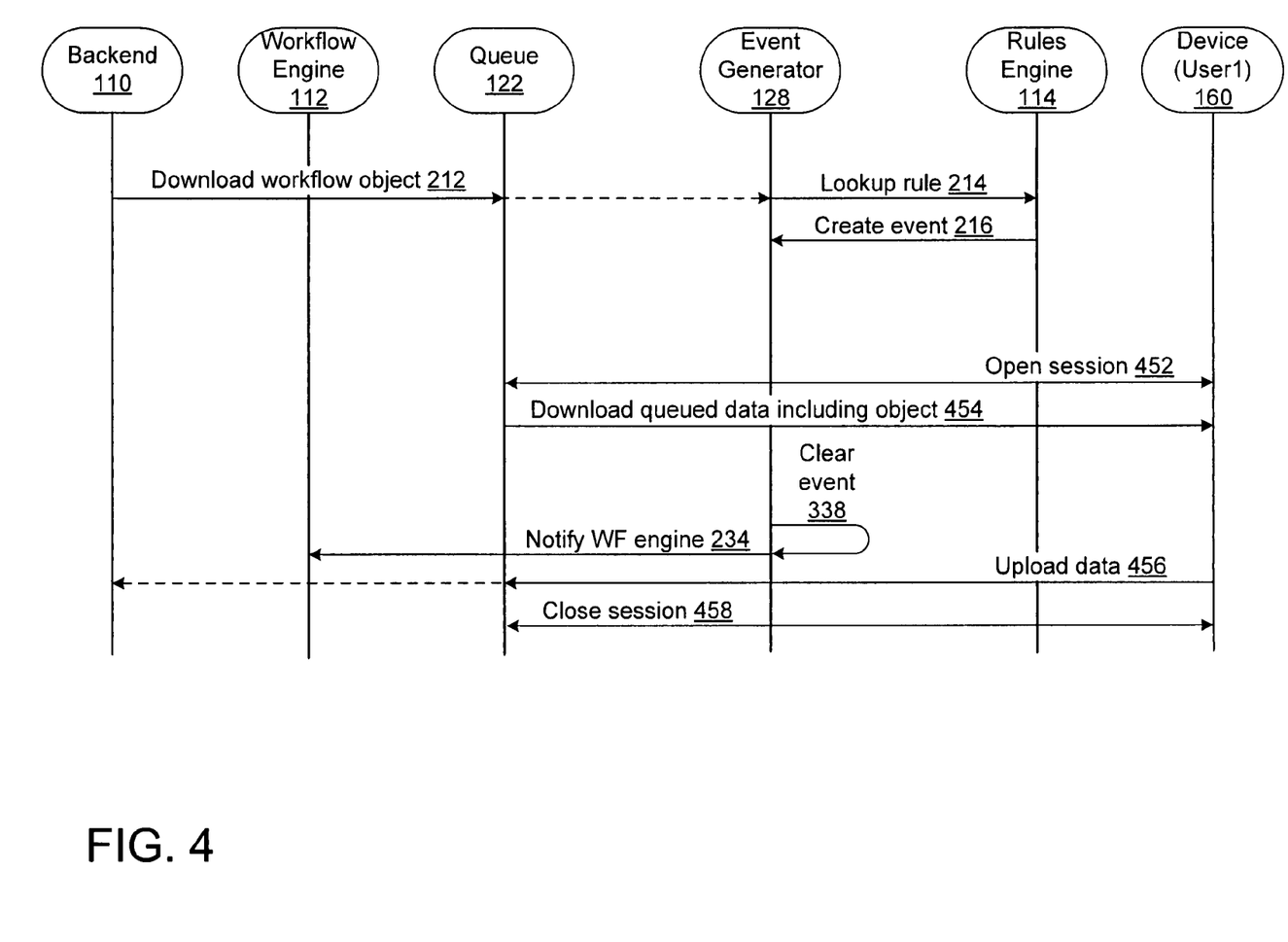
FIG. 4 is a flow diagram illustrating the delivery of time sensitive data to a user.

FIG. 4 illustrates the operations of the event-aware middleware 120 when a client connects to synchronize data. The user device 160 opens (452) a communication session with the middleware 120 via network 132. Data in the queue 122 for the user, including an object associated with an event, is downloaded to the device 160, and data from the device 160 is uploaded (456) to the middleware (456). At some point thereafter, the communication session between the device 160 and middleware 120 is closed (458).

The event generator 128 may monitor the queue 122 or the inbound/outbound handler 124 to determine when an object associated with an event is transmitted, or the inbound/outbound handler 124 may be modified to determine when an object associated with an event is transmitted. The event associated with the object is cleared (338) and an automatic notification may be sent (234) to the workflow engine 112 for workflow tracking purposes.

The event-aware middleware 120 may relay data to a user via a remote communications station 140 (FIG. 1). A communication station 140 provides a local data store 144. When the remote devices 160 come online, the data is fetched from the local data store 144 instead of from the middleware 120. Synchronization using the remote communication station 140 may be more efficient for the user than if the user established a communication session directly with the middleware 120 of a central system. For example, in geographic regions where long-distance communications are slow or erratic, being able to synchronize with a local data store accelerates performance.

The data can either be pushed to the communication station 140 from the middleware 120 or the data can be pulled from the middleware 120 by the communication station 140. In either case, communication sessions preferably occur at periodic intervals.

Among other advantages, remote communications stations 140 permit data to be aggregated for multiple users and downloaded when the user devices 160 are offline, while enabling the session to be scheduled at non-peak hours (e.g., when there are lower telecom costs or less network traffic). For example, if the communication station is in the United States and the middleware server is in Europe, the data can be downloaded to the communication station at night time of the United States when the network traffic is less and additionally when all the clients in the United States connect in the morning, they utilize only the local network providing fast and speedy synchronization. Downloading to the communication station 140 also facilitates high data volumes at synchronization.

Figure 5:
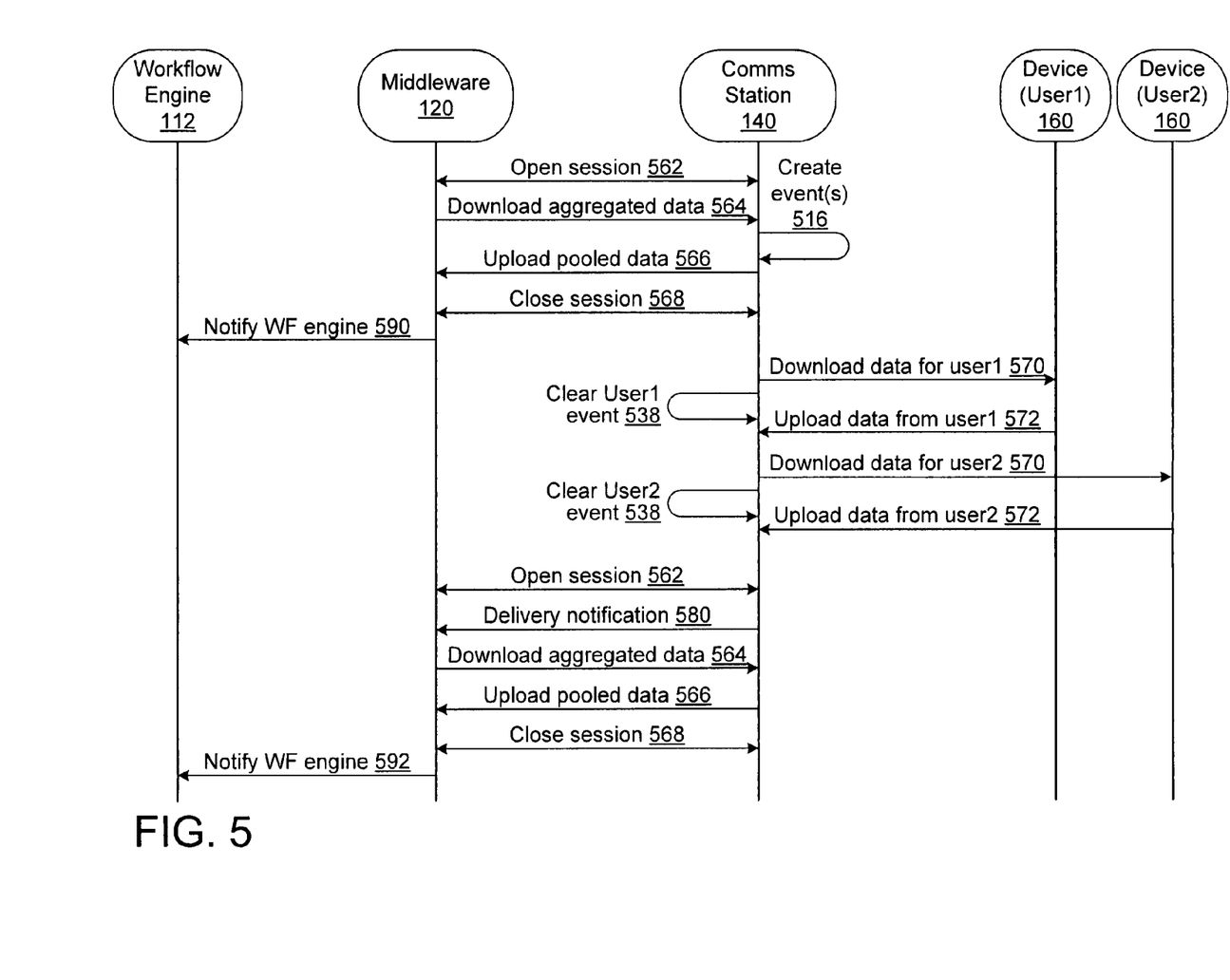
FIG. 5 is a flow diagram illustrating the delivery of time sensitive data to a user via a remote communications station.

The middleware 120 aggregates data from a backend system or systems 110 in the queue 122 for a plurality of users. Referring to FIG. 5, after a communication session is opened (562), the data in the queue 122 is transmitted to the communications station 140 from the middleware 120 over the network 130. The communication session may be opened (562) by either the middleware 120 or the communications station 140. The opening of the communication session (562) may be periodically initiated, may be initiated based on the quantity of data filling the queue 122 and/or local store 144, and/or may be based upon the urgency of data held in the queue 122 and/or local store 144 (e.g., a rule may indicate that if extremely time-sensitive data is added to the queue 122 or local store 144, a session should be opened at a non-scheduled time).

A server communication handler 142 within the communications station 140 handles transactions with the middleware 120. Aggregated data received (564) from the middleware 120 is held in a local store 144.

After the communication session between the middleware 120 and the communications station 140 closes (568), if a remote device 160 connects to the communications station 140 via network 150, a client communication handler 146 downloads (570) data from the local store 144 to the device 160. The client communication handler 146 also uploads (572) any data on the device 160 intended for the middleware 120 and queues it in the local store 144. Pooled data uploaded from the devices 160 will be transmitted (566) to the middleware 120 during the next session between middleware 120 and the communication station 140.

To optimize bandwidth, if duplicate data is needed on a plurality of remote devices 160 associated with a particular communications station 140, it can be transmitted once during a session with the communications station 140 and then copied by the communications station as needed during individual sessions with the remote devices 160. This also facilitates using a smaller local store 144 in the communications station 140. The communications station 140 may use a unique site identifier which the middleware 120 associates with all of the users assigned to that station 140.

If duplicate data is downloaded only once for a plurality of users, the unique data to download to a specific user may include a pointer (e.g., a uniform resource identifier) mapped to where the shared data will be stored in the local store 144.

Once unique data is downloaded from the local store 144 to the device 160 for a user, the unique data may be flushed from the local store 144. Likewise, once data from a user held in the local store 144 is uploaded to the middleware 120, it may be flushed from the local store 144.

Which users are associated with which communications stations 140 may be centrally defined in the user registrar 126 of the middleware 120.

In order to avoid time-managed data languishing in the local store 144 of the communications station 140, event management can also be enabled in the communications station.

Event generation and management in the communications station 140 may operate on the same principles described herein for the middleware 120. The communications station 140 may employ an event generator 148 having capabilities as described above for event generator 128, creating events (516) based on an analysis of an object received from the middleware 120, logic embedded in the object, and/or the application of locally stored rules to the object.

After the middleware 120 downloads (564) the aggregated data including at least some time-sensitive objects to the communications station 140, a notification may be sent (590) by the middleware 120 to the workflow engine 112 for tracking purposes.

During each session between the communications station 140 and a user device, the event generator 148 clears (538) the events for the data downloaded to the user.

Then, during the next session between the communications station 140 and the middleware 120 after a user downloads time-sensitive data from the communications station 140, a delivery notification or notifications are sent (580) from the communications station 140 to the middleware 120, and may then be forwarded (592) to the workflow engine 112.

Figure 6:
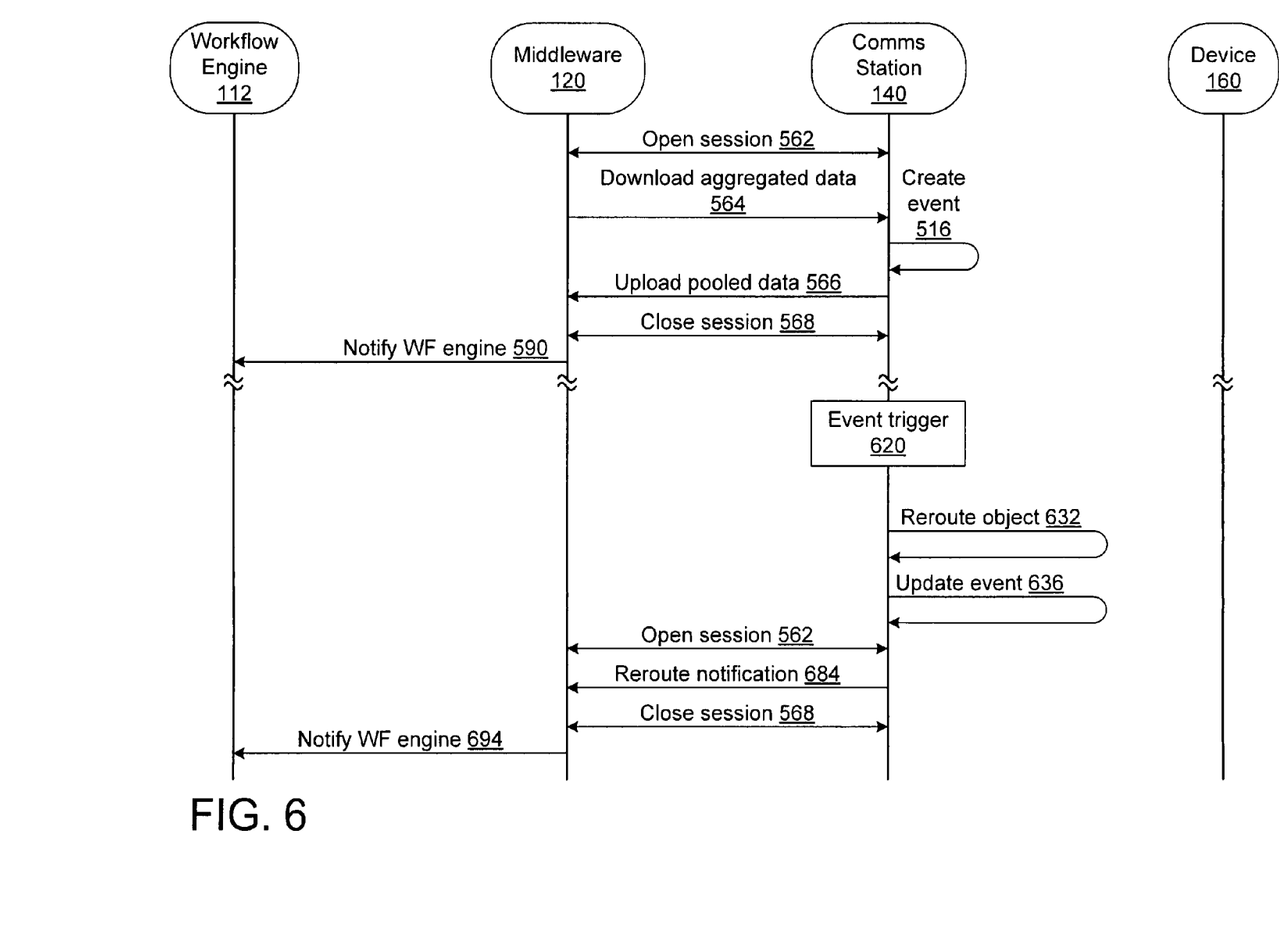
FIG. 6 is a flow diagram illustrating the creation and triggering of an event in the communications station and the redesignation of the data for delivery to another user of the communications station.
Figure 7:
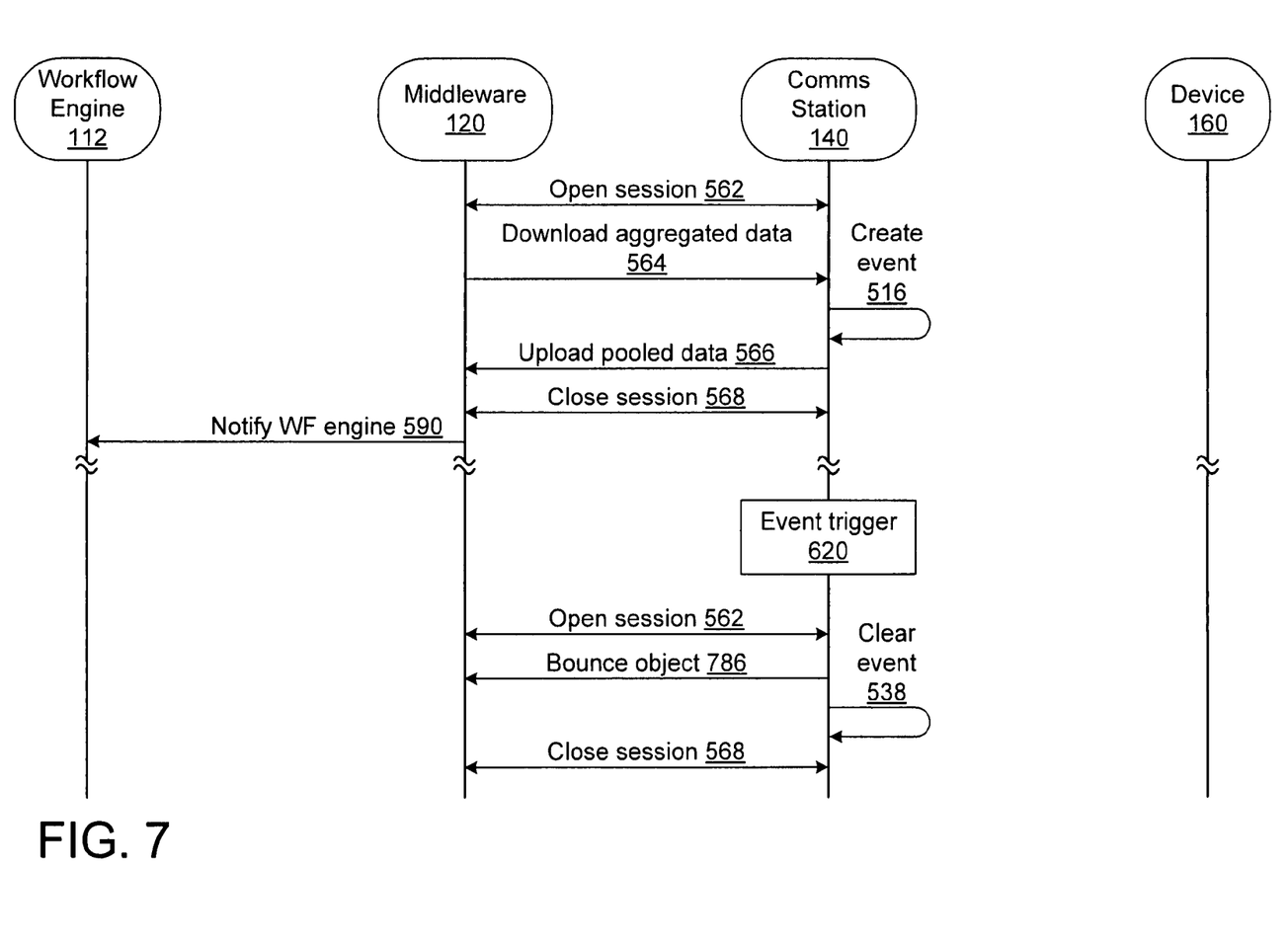
FIG. 7 is a flow diagram illustrating the creation and triggering of an event in the communications station with the bouncing of the data back to the middleware for redistribution.

FIGS. 6 and 7 illustrate an event trigger 620 occurring on the communications station 140 when an object is left sitting in the local store 144 without pick-up.

In FIG. 6, as specified by a rule, the event generator 148 reroutes (632) the workflow object to another subscriber of the same communications station. The communication station 140 also replaces (636) the event to reflect the change. During the next session between the communications station 140 and the middleware 120, the communications station 140 notifies (684) the middleware that the object has been rerouted. The notification may then be relayed (694) to the workflow engine 112.

In FIG. 7, as specified by a rule, the event generator 148 bounces (786) the workflow object back to the middleware 120 and clears (538) the corresponding event. Bouncing might occur as the result of a first rule, or might be invoked when a first rule (e.g., FIG. 6) can not be carried out. The bounced message sent to the middleware 120 is preferably relayed to a target destination (e.g. backend 110; workflow engine 112) like ordinary data without processing.

If rules are stored on the communications station 140, they are preferably provided via the middleware 120 during a communication session. The rules stored on the communications station 140 can be a subset of the rules available to rules engine 114.

A rule may specify whether actions (e.g., 684, 786) dictated by the rule on the communications station 140 are communicated to the middleware 120 during a scheduled session, or whether a more-immediate session is initiated.

While the event generator 148 on the communications station 140 may operate in a similar manner to event generator 128, there may also be coordination between rules engines, lowering the processing requirements at the communications station 140 to manage events. For example, the event generator 128 in the middleware 120 can create a data file or files comprising events for particular users and transmit the data to the communications station 140 during a communication session. The rules and functions needed for execution upon the triggering of each event may also be included with the data.

If the middleware 120 or communications station 140 change the destination of a workflow object, a message may be sent to the original assignee that the task/job/order was reassigned.

While the examples use workflow objects as the time-sensitive data, the system can be configured to work with any kind of data. Even if the attributes of the data are not called out within the data itself, rules may be applied to determine whether an event should be generated.

The various components of the middleware 120 and/or the communications station 140 described herein may each be implemented as one or more processes on one or more computer systems. Each computer system may include a storage component for storing machine-readable instructions for performing the various processes described above. The storage component may be any type of machine readable medium (i.e., one capable of being read by a machine) such as a compact disk, hard drive memory, flash memory, floppy disk memory, DVD-ROM, CD-ROM or any type of machine readable (computer readable) storing medium. Each system or systems may also include addressable memory (e.g., random access memory, cache memory) to store data and/or sets of instructions that may be included within, or be generated by, the machine-readable instructions when they are executed by a processor on the respective system. The queue 122, local store 144, and user registrar 126 each include memory that may be selected from addressable memory (e.g., random access memory, cache memory) and a rewritable storage component (e.g., hard drive memory, flash memory, floppy disk memory).

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method comprising:
   queuing user-specific data for a plurality of users by a processor, at least some of the data being time-sensitive;
   storing the queued user-specific data for a plurality of users in a computer-readable storage medium associated with a middleware platform;
   searching, by the processor, for the time-sensitive data;
   extracting, by the processor, rule information from the time-sensitive data;
   responsive to time-sensitive data being queued, creating a first time-based trigger based at least in part upon the extracted rule information;
   generating a workflow tracking message indicating that the time-sensitive data has been removed from the queue if the time-sensitive data is removed from the queue; and
   changing a destination of the time-sensitive data based upon the extracted rule information if the time-sensitive data is still in the queue when the first time-based trigger expires;
   wherein changing the destination of the time-sensitive data comprises:
   changing the destination of the queued data from a first user to a second user; and
   replacing the first time-based trigger with a second time-based trigger;
   wherein the time-sensitive data is associated with a workflow, the method further comprising:
   responsive to changing the destination of the time-sensitive data, generating a workflow tracking message indicating that the destination of the time-sensitive data has been changed.

2. The method of claim 1, further comprising:
   canceling the first time-based trigger if the time-sensitive data is removed from the queue.

3. The method of claim 2, further comprising:
   responsive to transmitting at least some of the queued time-sensitive data to a device of a respective user of the plurality of users, removing the transmitted data from the queue.

4. The method of claim 2, wherein changing the destination of the time-sensitive data comprises:
   transmitting at least some of the queued time-sensitive data to a destination other than the plurality of users; and
   removing the transmitted data from the queue.

5. The method of claim 1, wherein the user-specific data includes an identifier indicating time-sensitivity.

6. The method of claim 1, further comprising applying at least one rule to determine whether the user-specific data is time-sensitive.

7. The method of claim 1, wherein changing the destination of the time-sensitive data includes executing at least one rule.

8. The method of claim 7, wherein the rule to be executed to change the destination of the time-sensitive data is included in the time-sensitive data.

9. The method of claim 1, wherein the first time-based trigger is created on a first computer, the method further comprising:
   opening a communication session between the first computer and a second computer over a network;
   responsive to the opening of the communication session, moving the user-specific data from the first computer to a local data store of the second computer;
   closing the communication session;
   responsive to the time-sensitive being moved to the local data store, setting a second time-based trigger on the second computer; and
   executing a rule on the second computer to change a destination of the time-sensitive data if the time-sensitive data is still in the local data store when the second time-based trigger expires.

10. The method of claim 9, the method further comprising, responsive to the time-sensitive data being moved to the local data store of the second computer, canceling the first time-based trigger on the first computer.

11. The method of claim 10, wherein the time-sensitive data is associated with a workflow, the method further comprising the first computer generating a workflow tracking message indicating that the time-sensitive data has been moved to the second computer if the time-sensitive data is moved from the first computer to the second computer.

12. The method of claim 9, wherein the second time-based trigger is set based at least in part upon content of the time-sensitive data.

13. The method of claim 9, further comprising:
    creating the second time-based trigger on the first computer; and
    transmitting the second time-based trigger to the second computer during the communication session.

14. The method of claim 9, further comprising, responsive to a device of a respective user of the plurality of users connecting to the second computer:
    transmitting at least some of the time-sensitive data from the local data store to the device;
    removing the transmitted data from the local data store; and
    canceling the second time-based trigger.

15. The method of claim 14, wherein the time-sensitive data is associated with a workflow, the method further comprising, responsive to the device of the respective user connecting to the second computer:
    generating a workflow tracking message indicating that the time-sensitive data has been delivered to the respective user;
    storing the workflow tracking message in the local data store; and
    transmitting the workflow tracking message to the first computer during a next communication session.

16. A computer-readable storage medium storing instructions adapted to be executed by a computer to perform a method comprising:
    adding a time-based trigger to a list of time-based triggers if user-specific data is inserted into a memory and is time-sensitive, the memory to queue user-specific data for one or more users for distribution, wherein the time-based trigger is configured based upon rule information extracted from the time-sensitive user-specific data;
    generating a workflow tracking message for a workflow engine indicating that the time-sensitive user-specific data has been removed from the queue if the time-sensitive data is removed from the queue;
    responsive to determining that at least one of the time-based triggers in the list has expired, initiating an operation to act upon the time-sensitive data in memory that is associated with the expired time-based trigger, wherein the operation is chosen based upon the rule information extracted from the time-sensitive user-specific data; and deleting the time-based trigger from the list if the time-sensitive data associated with a respective trigger is removed from the memory;

determining whether user-specific data is time-sensitive by application of one or more rules to a respective data if the user-specific data is inserted into the memory;

transmitting, to a second computer, a copy of the time-based triggers from the list together with associated queued user-specific data, if the queued user-specific data is transferred from the first computer to the second computer for distribution to one or more users from the second computer.

17. The computer-readable storage medium of claim 16, the method further comprising:

transmitting, to a second computer, a copy of the time-based triggers from the list together with associated queued user-specific data, if the queued user-specific data is transferred from the first computer to the second computer for distribution to one or more users from the second computer.

18. A system comprising:

a workflow engine module to generate workflow tasks in conjunction with one or more software application programs, and to monitor progress toward completion of the workflow tasks;

a middleware module to queue user-specific data associated with workflow tasks for delivery to one or more users, wherein the middleware module is to determine whether the user-specific data is time-sensitive based upon information embedded in the user-specific data by the workflow engine module and, if the user-specific data is time-sensitive, the middleware is to generate a time-based trigger associated with the time-sensitive user-specific data, the middleware module including:

memory to store the queued user-specific data; and an event generation module to manage the queued user-specific data in the memory that is time-sensitive and a rules engine module, the rules engine module to determine an operations to be executed upon the time-sensitive data in memory by application of one or more rules to attributes of a respective data, wherein the operations to be executed upon the time-sensitive data are chosen based upon the information embedded in the user-specific data by the workflow engine module and the operations are applied after expiration of the time-based trigger;

wherein the middleware module is to communicate to the workflow engine module operations executed upon the user-specific data associated with the workflow tasks;

wherein the middleware module is to determine whether user-specific data is time-sensitive based upon information embedded in the user-specific data by said one or more software application programs.

* * * * *